United States Patent [19]

Gregory

[11] 4,317,755

[45] Mar. 2, 1982

[54] SELF-POLISHING SEALING COMPOSITION

[75] Inventor: Gordon K. Gregory, Racine, Wis.

[73] Assignee: S. C. Johnson & Son, Inc., Racine, Wis.

[21] Appl. No.: 158,557

[22] Filed: Jun. 11, 1980

[51] Int. Cl.$^3$ .................. C09G 1/04; C09G 1/10; C09G 1/16

[52] U.S. Cl. .................. 524/276; 106/3; 106/8; 106/10; 106/11; 524/277; 524/320; 524/322; 524/475; 524/487; 524/488

[58] Field of Search .................. 106/3, 8, 10, 11; 260/23 AR, 28, 28.5 R, 29.6 H

[56] References Cited

U.S. PATENT DOCUMENTS

| | | | |
|---|---|---|---|
| 2,862,899 | 12/1958 | West | 260/28.5 D |
| 2,937,098 | 5/1960 | Geen | 106/8 |
| 2,964,487 | 12/1960 | Chapman | 106/10 |
| 2,993,800 | 7/1961 | Pickell | 106/10 |
| 3,086,871 | 4/1963 | Sheldahl et al. | 106/10 |
| 3,163,547 | 12/1964 | Vietor | 260/28 |
| 3,308,078 | 3/1967 | Rogers et al. | 260/28.5 R |
| 3,320,196 | 5/1967 | Rogers | 260/27 R |
| 3,393,078 | 7/1968 | Lockhart et al. | 106/10 |
| 4,013,607 | 3/1977 | Dwyer et al. | 260/28.5 R |
| 4,055,433 | 10/1977 | Morones | 106/11 |
| 4,071,645 | 1/1978 | Kahn | 106/8 |
| 4,163,673 | 8/1979 | Dechert | 106/11 |
| 4,230,605 | 10/1980 | Connolly et al. | 106/3 |

Primary Examiner—Ronald W. Griffin

[57] ABSTRACT

A water based self-polishing sealing composition as a protective coating for floors, metal parts and the like, utilizes a film forming polymeric coating agent and a hydrocarbon solvent having a solubility parameter from about 7.8 to 9.8 emulsified with a compatible surfactant.

6 Claims, No Drawings

SELF-POLISHING SEALING COMPOSITION

BACKGROUND OF THE INVENTION

This invention relates to a sealing composition for various substrates, including floors or metallic surfaces. In particular, it relates to an improved self-polishing sealer for floors, which provides better adhesion for later-applied water-based floor finishes.

Sealing compositions have been widely utilized and are normally applied over substrates to prepare them for final finishes. Commercially available sealers for floors, metal parts and other substrates have several major limitations. For example, resilient floors, which have not been thoroughly cleaned or which have been maintained with buffable waxes, tend to build up hydrophobic residues of oily or waxy hydrocarbons. Further, a protective hydrophobic or mill finish coating is often applied to new flooring. Flooring, which has been maintained or prepared to contain a hydrophobic coating or residue, resists application of water-based waxes, sealers or protective coating, due to a lack of adhesive sites.

Metal parts are often coated with waxy or oily release agents to expedite processing in mold-forming machines. A rust retardant must be able to penetrate the release agent to adhere to and seal the part. Machine parts having a lubricating layer require a protective paint finish, periodically. Conventional water-based paints do not adhere to oily lubricated surfaces. Tile floors contain minute pores which have a tendency to collect waxes and other residues. These waxes and residues form a seal on the tile and prevent the tile beneath from being wetted by water-based finishes.

In each of the problem areas illustrated above, a sealing composition is required which can penetrate the oily or waxy residues to provide anchoring or adhesion sites for a water-based finish, such as a floor polish, paint, wax or protective coat.

Previously, substrates with accumulated hydrophobic residues were treated with hydrocarbon-solvent-based sealers. However, such organic solvent-based sealers have been criticized as environmentally undesirable, as unduly expensive and wasteful of petroleum feedstocks and as detrimental to work-place safety. Such organic solvent based sealers are not self-polishing and require buffing. Water-based coating compositions are preferred, since they meet previous objections and can be formulated to be self-polishing. Unfortunately, prior, water-based compositions do not provide sufficient adhesion to substrates previously treated with oil-based buffable finishes.

It is most desirable for many applications that the sealing composition dry to a glossy film (dry-bright) without the need for time-consuming and expensive buffing steps. It has, therefore, long been desired to provide a self-polishing sealing composition for substrates having pores filled with hydrophobic residues, which will provide enhanced adhesive sites for a later applied water-based finish.

In columns 7 and 8 of U.S. Pat. No. 2,862,899 there is disclosed an emulsion polish optionally employing a hydrocarbon solvent. The solvent functions to disperse or dissolve the active wax and polytrifluorochloroethylene ingredients. The polish does not dry bright and normally requires buffing to achieve a glossy finish. Minor amounts of resin, below 10% by weight, are optionally employed as a diluent for the wax.

A water-based coating composition containing a hydrocarbon is disclosed, in U.S. Pat. No. 3,086,871, as useful for plugging pores in chrome plate. The composition must be buffed to provide gloss and does not contain film-forming polymers. U.S. Pat. No. 2,993,800 describes compositions useful as sizings for paper, which employ solvents to dissolve wax for ease in handling. U.S. Pat. No. 3,393,078 discloses a water based emulsion polish containing a volatile hydrocarbon and a wax. This composition does not dry bright, but is buffed after application. No film-forming polymeric coating agents are present.

SUMMARY OF THE INVENTION

It is an object of this invention to provide a storage stable, self-polishing aqueous sealing composition for a substrate subject to accumulation of hydrophobic residues.

It is another object of this invention to provide a sealing composition adapted to penetrate hydrophobic residues in substrates and increase the adhesion of the substrate to later applied finishes.

It is yet another object of the present invention to provide a stable, self polishing, aqueous sealer to improve the adhesion of water-based floor finishes to floor surfaces having waxy residues accumulated in pores.

Other objects and advantages will become apparent from the following detailed description.

The above and other objects are met in a storage stable, self-polishing, sealing composition for a substrate, which is subject to accumulation of hydrophobic organic residues, wherein the residues reduce the adhesion of the substrate to finishing compositions. The sealing composition comprises an aqueous vehicle which contains a self-polishing film-forming polymeric coating agent and an emulsified hydrocarbon solvent. The solvent has a solubility parameter from about 7.8 to 9.8. Sufficient amounts of solvent are employed to penetrate the accumulated hydrophobic organic residues and to increase the adhesion of the substrate to finishing compositions.

As employed herein, the term "self-polishing film-forming polymeric coating agent" refers to polymer systems which can be stored for prolonged periods, are substantially free from gelling and changes in viscosity, or phase separation and which dry from an aqueous carrier to a glossy finish. As employed herein; the term "solubility parameter" or "δ" refers to ability to solubilize or the solvent power of a solvent.

In the present compositions, hydrophobic hydrocarbon solvents are employed to aid in penetrating and achieving a partial dissolution of the waxy, oily residues in the substrate to improve the adhesion of the sealer. It is postulated that the hydrocarbon solvent attacks the accumulated residue and removes portions thereof, so water based finishing compositions can be successfully applied. Previously, hydrocarbon solvents were incorporated in aqueous, wax-polish emulsions in amounts sufficient to disperse or dissolve the wax as a water-out emulsion. Additional hydrocarbon solvent, beyond the minimum quantity required to disperse the wax, was unneeded and undesirable, since the excess solvent could float to the surface of the emulsion and pose various difficulties.

It has now been found that excess hydrocarbon solvents, beyond that needed to disperse any wax therein, can be incorporated into an aqueous sealer composition providing that a proper selection of solvent and emulsifier are made, taking into account the solubility parameter of the solvent and the HLB (hydrophile-lipophile balance) of the emulsifier (or surfactant).

Solubility parameter is a term known to the art and is discussed in detail in the Kirk-Othmer *Encyclopedia of Chemical Technology*, 2nd Ed. Supplement, at pages 889–910 (1971). Solubility parameter has been defined as the square root of the energy of vaporization per cubic centimeter of a solvent. Thus $\delta = (\Delta E_v)/(V)^{\frac{1}{2}}$; where $\Delta E_v$ is energy of vaporization and V is molar volume. Solubility parameter is also expressed as $\delta^2 = \delta_D2 + \delta_P2 + \delta_H2$, where $\delta_D$ is the dispersion component of the solubility parameter; $\delta_P$ is the polar component of the solubility parameter and $\delta_H$ is the hydrogen bonding component of the solubility parameter. Such parameters are available for a large number of solvents, as set forth in Table 1 on pages 892–896 of the Kirk-Othmer text reference, which reference is incorporated herein for pages 889–910.

The concept of 'HLB' is well known to those with ordinary skill in the art and is set forth in particular, in *Clues To Surfactant Selection Offered By The HLB System* by W. C. Griffin, Official Digest, June 1956, which is expressly incorporated herein. For the present composition, an oil-in-water emulsion, the solubility parameter of the solvent should be about 7.8 to about 9.8 and the HLB of the surfactant (or emulsifier) should be from about 12.5 to about 15.5. Mixtures of solvents and surfactants within the relationship expressed above are also employed.

Stable, self-polishing sealers for coating floors subjected to heavy traffic or maintained with buffable wax polishes are provided which include an aqueous emulsion polymer floor coating composition having dispersed therein a hydrocarbon solvent having a solubility parameter from about 7.8 to 9.8 and a nonionic surfactant to emulsify the solvent, having an HLB between about 12.5 and 15.5. The floor coating composition can either be in emulsion, alkalisoluble or solution, form.

DESCRIPTION OF THE PREFERRED EMBODIMENTS

In general, the sealing compositions of the invention have a non-volatiles content from about 7% to 25% by weight of the total composition and, preferably, from about 12-25% by weight of the composition. At lower ranges of non-volatiles, the gloss characteristics of the applied film and the durability of the film, including the black heel mark resistance of the film, are somewhat reduced. At the higher range of solids, the converse is obtained, since greater film thickness, is obtained.

In addition to the sealing compositions containing from about 7 to 25% non-volatiles, the present composition may also be prepared in a concentrated form containing up to about 30-40% solids. Such concentrated compositions are diluted during use, either by mixing the concentrate with water or upon application thereof with a wet mop or applicator.

The coating compositions of the present invention can be applied by hand. For this and other purposes including stability, the pH of the sealing composition is adjusted from about 6 to 10.5 to limit or reduce any adverse dermal or other reactions. For the preferred emulsion floor coating compositions of the invention, the pH is between about 7.5 and about 9.6 and, most preferably, about 9.2.

The self-polishing, stable, film-forming agents are preferably emulsion floor coating compositions, alkalisoluble floor coating compositions or solution floor coating compositions. Typical emulsion floor coating compositions which may be suitable are disclosed in U.S. Pat. No. 3,308,078, which is incorporated herein by reference. Typical alkalisoluble floor coating compositions which may be suitable are found in U.S. Pat. No. 3,320,196, which is incorporated herein by reference. Typical solution floor coatings which may be suitable are disclosed in U.S. Pat. No. 4,013,607, which is incorporated herein by reference.

The sealer compositions of the present invention employ a self-polishing film-forming polymer and an emulsified hydrocarbon solvent. In the preferred floor sealing compositions, the film-forming polymer will include an emulsion polymer and an alkali-soluble resin. An emulsifying surfactant is present to disperse the hydrocarbon solvent. Other materials typically present in such floor coating compositions include leveling agents, plasticizers, emulsifiable waxes, alkanolic-film enhancers, pH modifiers (as ammonia), film modifiers, perfumes and the like.

The emulsion polymers employed in the emulsion polymer floor coatings are the conventional polyligand emulsion polymers having a minimum film forming temperature (MFT) of less than about 80° C. and formed from 0–20% of an acrylic acid (AA), or methacrylic acid (MAA) monomer (acid-containing monomer) and from 80% to 100% of at least two ligand-free polymerizable monomers selected from acrylate or methacrylate derivatives and vinyl-aryl or vinylalkaryl monomers, as set forth generally in U.S. Pat. No. 3,308,078. Typical acrylates, methacrylates and vinyl aryl or alkaryl monomers are styrene(S), α-methylstyrene (AMS), vinyl toluene (VT), methyl methacrylate (MMA), ethyl methacrylate (EMA), ethyl acrylate (EA), butyl acrylate (BA), 2-ethylhexyl acrylate (EHA), and the like. The emulsion polymers employed preferably have a glass transition temperature (Tg) between about −15° C. and +75° C. For most applications it is preferred that the Tg is from −15° C. to +25° C. The acid-containing monomer is included if some alkali strippability is desired for the sealing composition.

Preferred emulsion polymers are formed from the following monomers in amounts expressed in parts by weight.

(A) 30 methyl methacrylate/60 butyl acrylate/10 methacrylic acid
(B) 65 styrene/30 butyl acrylate/5 methacrylic acid
(C) 55 styrene/40 ethyl acrylate/5 methacrylic acid
(D) 58 styrene/30 ethyl acrylate/12 methacrylic acid
(E) 49 methyl methacrylate/44 butyl acrylate/7 methacrylic acid The Tg of (A) is −3° C. The Tg of (B) is 39° C. The Tg of (C) is 43° C. The Tg of (D) is 63° C. The Tg of (E) is 17° C.

A particularly preferred emulsion polymer is formed from the following monomers: (F) 38–49 parts methyl methacrylate/48–52 parts butyl acrylate/5–9 parts methacrylic acid. The Tg of (F) is generally from about 4°–17° C.

The preferred emulsion polymers generally possess a weight average molecular weight over about 100,000.

In general, the emulsion polymers are employed in the sealing compositions in amounts from 0 to 99% by weight of solids, usually from 20 to 90% by weight of solids and, preferably, from 50 to 80% by weight of solids. All solids weights are based on the total weight of solids of the composition.

Conventional alkali soluble resins having a weight average molecular weight from about 500 to 10,000 and preferably from 1000 to 5000 are also employed as film-formers. These can include condensation type resins having an acid number from about 120 to about 220, addition type resins having an acid number from about 140 to about 300 and mixtures thereof. The addition type resins are formed from a vinyl aryl or vinyl alkaryl monomer and acrylic acid or methacrylic acid or maleic acid monomer. Other unsaturated acid monomers can be employed, such as crotonic acid, fumaric acid, and itaconic acid. Typical preferred alkali soluble resins are formed from the following monomers: styrene/acrylic acid; styrene/maleic acid, alpha methyl styrene/styrene/butyl acrylate/acrylic acid and methyl methacrylate/methacrylic acid.

The addition type alkali soluble resins are often employed as a conventional resin cut, which is an aqueous solution of the resin with an alkaline substance having a fugitive cation (such as ammonium hydroxide).

If desired, other commercially available alkali soluble resins can be employed, such as rosin/maleic anhydride adducts which are condensed with polyols, and the like.

The particular alkali soluble resin and level of addition to the sealer composition are selected based upon the appropriate balance of gloss, leveling and adhesion desired. In general, the alkali soluble resin is employed in amounts from 0 to 92% by weight of solids, more preferably from 0 to 40% by weight of solids, and when employed as a resin cut in an emulsion floor sealing composition, from about 10 to 15% by weight of solids.

A preferred alkali soluble resin is formed from 67% styrene and 33% acrylic acid, said resin having a weight average molecular weight from about 6500 to 9500 and an acid number of 170 to 200.

The alkali soluble resin can be employed without an emulsion polymer to form a solution coating sealer composition. It can also be employed with an emulsion polymer in varying proportions to provide an alkali soluble or emulsion type sealing composition. In an alkali soluble system, from about 30 to 50% by weight of solids of alkali soluble resin is employed with about 20 to 60% by weight of solids of emulsion polymer.

The preferred emulsion polymer system utilizes from about 50 to 80% by weight of solids of an emulsion polymer and 10 to 20% by weight of solids of an alkali soluble resin.

The hydrocarbon solvent is a weakly-hydrogen-bonded solvent having a solubility parameter, $\delta$, between about 7.8 and 9.8. Solvents which function as adhesion promoters in the present invention include certain aromatic hydrocarbons, paraffinic hydrocarbons, halohydrocarbons, ketones and esters. Examples of such hydrocarbon solvents include toluene ($\delta=8.9$), naphtha ($\delta=7.8$), dipentene ($\delta=8.5$), trichloroethane ($\delta=9.6$) methyl isobutylketone ($\delta=8.4$), ethylacetate ($\delta=9.1$), carbitol acetate ($\delta=8.5$), 2-ethyl hexanol ($\delta=9.8$) and the like.

The non-aromatic solvents can sometimes be incompatable with resilient floor materials. However, such solvents are effective for use with coated metal parts and machinery.

Aromatic hydrocarbon solvents are preferred for floor sealing compositions of the invention. An especially preferred solvent is xylene, which has a $\delta$ of 8.8.

Hydrocarbon solvents are normally employed in amounts from about 0.1 to 20% by weight of the aqueous sealing composition, although greater or lesser amounts can be employed in certain cases. Preferably the solvents are utilized in amounts from about 1 to 15% by weight of the composition and, for best results, from about 3% to 5% by weight of solvent is employed.

An extremely desirable ingredient in the present sealing compositions is a surfactant. Preferably anionic or nonionic surfactants are employed, which serve to; enhance the dispersability of the hydrocarbon solvent, increase the storage stability of the composition, reduce the tendency of the composition to foam or bubble on application, and allow even film formation of the composition upon application (leveling).

To emulsify the solvent, preferably a nonionic surfactant is employed, although anionic surfactants may sometimes be utilized for this purpose. Preferred nonionic surfactants are the ethylene oxide and/or propylene oxide derivatives of alkyl phenols, aliphatic acids, aliphatic alcohols, glycols, glycol ethers, alkaryl esters and vegetable oils. The surfactants should have a hydrophiliclipophilic balance (HLB) between about 12.5 and 15.5, preferably between 13.5 and 14.5.

Especially suitable nonionic surfactants include the fatty acid esters of sorbitol copolymerized with at least about 20 moles of ethylene oxide, such as polyoxyethylene (20 moles) sorbitan monooleate (HLB 15.0). Mixtures of such sorbitan derivatives with the partial esters of fatty acids (such as lauric, stearic, palmitic, oleic) condensed with hexitol anhydrides derived from sorbitol, are also preferred.

An especially preferred nonionic surfactant is an ethylene oxide modified alkyl phenol and particularly, nonyl phenol modified with 12 moles of ethylene oxide having an HLB of 14.1.

The nonionic surfactant is generally employed in amounts from about 0.05 to 8% by weight of solids.

It has been found that fatty acids can act as a leveling aid and can assist in emulsifying the hydrocarbon solvent. In general, typical fatty acids include the $C_{12}-C_{18}$ saturated or unsaturated fatty acids of animal or vegetable origin. Fatty acids synthesized from petroleum feedstocks, are also employed. The preferred fatty acid is a so-called tall oil fatty acid (TOFA), which is a mixture of rosin acids, fatty acids and other material obtained by the acid treatment of the alkaline liquors derived from the digesting of pine wood. The tall oil fatty acids contain about 35–40% rosin acids and 50–60% fatty acids. Other saturated fatty acids include lauric, palmitic and stearic acids. Unsaturated fatty acids include oleic acid.

Usually the fatty acids are employed in amounts from 0–10% by weight of solids, preferably from about 2 to 5% by weight of solids.

Where the sealing compositions of the invention are to be employed as sealer-polishes or in other high gloss formulations exposed to foot traffic, as floor coatings, it is preferable to incorporate a wax to improve the wear properties of the composition. The waxes or mixtures of waxes which may be used include waxes of a vegetable, animal, petroleum derived, and/or mineral, origin. Typical waxes include carnauba wax, candelilla wax oxidized Fischer-Tropsch wax, microcrystalline wax, lanolin; bayberry wax, palm kernal wax, mutton tallow wax, emulsifiable polyethylene wax, polyethylene copolymers, emulsifiable petroleum derived waxes, montan wax derivatives, emulsifiable polypropylene wax and the like.

A preferred wax is an oxidized polyethylene wax.

The waxes are employed in amounts from 0 to 30% by weight of solids, and preferably from 2 to 5% by weight of solids.

The compositions may contain from about 0 to about 20% by weight plasticizers wherever necessary to provide a film of suitable hardness and appearance. It has been found that most hard resins can be plasticized to improve their film forming properties. Such resins often have a Tg from 25° C. to 75° C. Since the purpose of the plasticizer is to impart film forming properties to the coating composition and since it is not always necessary to impart flexibility to the resin composition when it is inherently tough and flexible, a fugitive or semi-fugitive plasticizer may sometimes be employed rather than a permanent plasticizer. Mixtures of fugitive and permanent plasticizers may also be employed.

Examples of essentially permanent plasticizers that are suitable include benzyl butyl phthalate, dibutyl phthalate, dimethyl phthalate, triphenyl phosphate, 2-ethylhexyl benzyl phthalate, butyl cyclohexyl phthalate, mixed benzoic acid and fatty oil acid esters of pentaerythritol, poly(propylene adipate) dibenzoate, diethylene glycol dibenzoate, tetrabutylthiodi-succinate, butyl phthalyl butyl glycolate, triethyl citrate, acetyl triethyl citrate, tributyl citrate, acetyl tributyl citrate, dibenzyl sebacate, tricresyl phosphate, toluene ethyl sulfonamide, the di-2-ethylhexyl ester of hexamethylene glycol diphthalate, di-(methylcyclohexyl)-phthalate and tributyl phosphate.

Examples of fugitive plasticizers include the monoethyl or monomethyl ether of diethylene glycol, isophorone, benzyl alcohol, and 3-methoxybutanol-1. The particular amount of plasticizer employed is chosen in accordance with the demand for compatability and film flexability.

A particularly preferred plasticizer, which also serves as a leveling agent, is tributoxyethyl phosphate.

For most purposes from about 5-10% by weight of solids of plasticizer is employed. Lesser amounts may be utilized where polymers having low glass transition temperatures, predominate.

In order to enhance the characteristics of a film formed from the instant sealing composition, from 0-10% by weight of a polyhydroxy polyether, a lower alkanol or high-boiling glycol can be employed. These organic solvents aid in extending the drying time of the coating composition. Also, more importantly they aid in coalescing the polymer and wax particles to provide a more uniform film, as well as imparting increased gloss and leveling characteristics to the composition. Typical polyethers include mono- and dialkyl ethers of diethylene glycol and their derivatives, also known as Carbitols. Typical glycols are ethylene glycol, polyethylene glycol, propylene glycol, polypropylene glycol, etc., while the alkanols include isopropanol, butanol, etc. A particularly preferred polyether is diethylene glycol monoethyl ether, also identified herein as Carbitol. The polyethers can be used alone or combined with the alkanols or polyhydric alcohols, such as ethylene glycol.

For the purposes of this invention from about 0-7% by weight of composition of the polyether is employed.

In addition to the leveling function imparted by the plasticizer and surfactants, the composition of the invention may include from 0-1% by weight of solids of a leveling agent, such as the fluorochemical leveling agents disclosed, inter alia, in U.S. Pat. No. 2,937,098 and U.S. Pat. No. 3,163,547.

Aqueous ammonia is present in the compositions of the invention in a concentration sufficient to provide a pH of from about 6 to 10.5 Ammonia may be provided in the coating composition in the form of concentrated ammonium hydroxide. A portion or all of the ammonium hydroxide may be replaced with sodium or potassium hydroxide or an organic amine. However, such replacement is usually accompanied by a decrease in the water resistance (spotting resistance) of the product.

In general, typical floor sealing compositions of the invention comprise by total weight of composition from: 12–70% water; 25–40% emulsion floor polish polymer; 3–20% alkali soluble resin; 0.01 to 20%, preferably 1–15%, most preferably, 3–5%, hydrocarbon solvent; 0–18% and preferably, 1–3% wax emulsion; 0.05–0.75% nonionic surfactant; 0.2–1% fatty acid; 0.2–1% ammonia; 0.5–3% plasticizer; 0.01–1% fluorochemical leveling agent and 0–1% polyether alcohol.

If desired formaldehyde or other antimicrobial agents may be employed in conventional amounts (0.1%) to prevent undesired haze or odors from developing in the compositions upon prolonged storage and to otherwise ensure biological stability.

The compositions of the invention may also be used for impregnating and sealing the pores of textiles, leather, paper or other porous or fibrous materials. They may also be applied to plastic sheets such as cellophane, polyethylene, polyethylene glycol terephthalate, saran and the like. They may also be applied to rigid surfaces, including metals, such as steel, aluminum, copper, tin, wrought iron and painted surfaces such as auto bodies. The compositions can also be applied to wood, stone, brick, glass, cement, asbestos shingles or siding, terrazzo, and concrete surfaces, such as floors and the like. The compositions are particularly preferred for sealing and polishing floors and plastic tiles, such as linoleum, asphalt, vinyl and vinyl-asbestos.

In general, the ingredients of the present compositions may be admixed in the order desired.

Where a wax is employed in the coating compositions, it is usually added to the composition in the form of an emulsion. Typical wax emulsions contain approximately 20 to 40% by weight solids and are formed by dispersing the wax in water by means of a suitable dispersing agent. Suitable agents include sodium salts of higher fatty acid sulfates, the higher fatty acid salts, ethylene oxide modified alkyl phenols and other conventional dispersing agents.

The hydrocarbon solvent is usually premixed with the nonionic surfactant and added to the charge as a solvent-surfactant homogeneous dispersion, under agitation.

The compositions of the invention can be applied to surfaces in a conventional fashion. In a preferred embodiment, as in a floor sealing composition; the composition is applied as follows. The floor is cleaned with a commercially available hard surface stripper-cleaner. After a thorough rinsing, the floor is allowed to dry. Next, a preferred formulation for use as a self-polishing floor sealer is applied by a suitable mopping, swabbing or dipping procedure. The film is allowed to dry. The sealed substrate can be recoated with a conventional emulsion floor finish to obtain maximum scuff resistance and durability.

A preferred composition adapted for use as a self-polishing floor sealer is set forth below. For each component percent by weight of total solids, parts solids, and percent by weight of composition, is provided.

PREPARATION EXAMPLE I

| Components | % Solids | Solids | % Composition |
|---|---|---|---|
| Emulsion polymer 41MMA/52BA/7MAA 35% solids solution | 71.50 | 11.44 | 32.69 |
| Alkali soluble resin 67S/33AA 20% solids solution | 15.00 | 2.40 | 12.00 |
| Xylene | | | 3.00 |
| Nonyl phenol condensed/12 moles ethylene oxide | 0.94 | 0.15 | 0.15 |
| Oxidized polyethylene wax emulsion 20% solids | 3.00 | 0.48 | 1.92 |
| Tall oil fatty acids | 2.50 | 0.40 | 0.40 |
| Tributoxyethyl phosphate plasticizer | 7.00 | 1.12 | 1.12 |
| Ammonia (28% solution) | | | 0.40 |
| Diethylene glycol monoethyl ether | | | 0.30 |
| Fluorochemical leveling agent | 0.06 | 0.01 | 0.04 |
| Water | | | 47.98 |
| | 100.00 | 16.00 | 100.00 |

The composition was prepared by the procedure set forth hereinafter. This preparation procedure is illustrative for the various sealing systems which can be formulated in accordance with the present invention.

To prepare the inventive formulation, the water, fluorochemical leveling agent and ammonia were admixed. Under agitation, the tall oil fatty acid was added to form an intermediate mix. In a separate container xylene and the nonionic surfactant were mixed until the surfactant was completely dissolved in the xylene. Next, under agitation, the xylene-surfactant blend was added to the intermediate mix and the resulting mixture was agitated to form a uniform blend. Next the emulsion polymer (Tg=5° C.) and alkali soluble resin were sequentially added to the uniform blend. Finally, the plasticizer and wax emulsion were added thereto under agitation and the resulting composition, filtered. The non-volatiles were 16%. The pH was about 9.2.

The composition was tested on a floor maintained with buffable wax polishes. The gloss of the composition was at least comparable to conventional water based finishes. The adhesion and spread was superior to conventional water based floor sealers.

The sealing compositions can also be applied to the numerous substrates as set forth hereinbefore, by various methods including application with a rag, mop, brush, non-woven cloth and by spraying and/or dipping.

The following examples are provided to further illustrate the present invention and are not limitive of scope. All temperatures are in degrees centigrade and all parts and percentages are by weight.

EXAMPLE I

In order to demonstrate the effectiveness of the present invention a self-polishing, emulsion polymer sealing composition was prepared. The composition of the sealer was as follows with ingredients present in percent by weight of composition:

| | |
|---|---|
| Polymer* | 45.4 |
| Xylene | 2.0 |
| Nonylphenol + 12 moles ethylene oxide | 0.1 |
| Fatty acid | 0.4 |
| flurocarbon leveling agent (1% solids) | 1.0 |
| Diethylene glycol monomethyl ether | 0.3 |
| Water | 50.8 |
| | 100.0 |

*35% emulsion polymer of 38 MMA/52BA/5MAA having a Tg of 40° C.

To prepare the composition, the water, DGME, fatty acid and fluorocarbon leveling agent were admixed, sequentially. The xylene and surfactant were premixed and added to the aqueous solution with agitation. The mix was stirred for 5 minutes and filtered. A stable, self-polishing sealer is obtained.

The sealer is applied to a vinyl floor, previously maintained with a buffable floor finish. After two, four and 24 hours, a piece of Scotch brand cellophane tape is applied across the finish and peeled off thereafter. The tape and floor are examined to determine if the film has been removed. The adhesion of the sealer film after 2, 4 and 24 hours was satisfactory and the tack after 2 hours was satisfactory. The sealer finish exhibits a high degree of gloss, and levels acceptably.

The sealing composition contained 99.3% of emulsion polymer solids. No alkali soluble resin, wax emulsion or plasticizer were present in this formulation.

EXAMPLE II

To illustrate the scope of emulsion polymers useful in the present invention five sealing compositions were prepared substantially as set forth in Preparation Example I with the exception that the following emulsion polymers were substituted in place of the emulsion polymer employed therein:

| | |
|---|---|
| II-A | 65S/30BA/5MAA; Tg 39° C.; 35% nonvolatiles - 26.8 parts |
| II-B | 55S/40EA/5MAA; Tg 43° C.; 35% nonvolatiles - 26.8 parts |
| II-C | 58S/30EA/12MAA; Tg 63° C. - 23.4 parts |
| II-D | 48 MMA/47EHA/5MAA; Tg (−) 14° C.; 25 parts |
| II-E | 53 MMA/42EHA/5MAA; Tg (−) 6° C.; 25 parts |

Tack, adhesion, gloss and leveling properties of the applied sealing film were satisfactory.

EXAMPLE III

To demonstrate the effectiveness of a sealing composition formed from an alkali soluble floor coating, the following composition was prepared in accordance with Example I and tested:

| | % of Composition |
|---|---|
| Emulsion polymer* | 14.3 |
| Alkali soluble resin** | 56.5 |
| Xylene | 3.0 |
| Nonylphenol + 12EO | 0.1 |
| Tall oil fatty acids | 0.4 |
| Tributoxyethyl phosphate | 1.1 |
| Wax emulsion*** | 1.7 |
| 28% ammonium hydroxide | 0.4 |
| Carbitol | 0.3 |
| Fluorocarbon leveling agent | 1.0 |
| Water | 21.2 |

-continued

| | % of Composition |
|---|---|
| | 100.0 |

*49 MMA/44BA/7MAA; 35% non-volatiles; Tg: 17° C.
**67S/33AA; 11.3% resin solution
***20% solids, oxidized polyethylene emulsion Adhesion and tack were superior to the sealer of Preparation Example I.

EXAMPLE IV

In order to demonstrate the utility of a sealer composition employing a solution floor coating polymer system, the following composition was prepared according to Example I and tested:

| | % of Composition |
|---|---|
| Alkali soluble resin cut (67S/33AA) (20% nonvolatiles) | 73.70 |
| Xylene | 3.00 |
| Nonylphenol + 12EO | 0.15 |
| Plasticizer (Dibutyl phthalate) | 1.10 |
| Leveling agent | 1.00 |
| Carbitol | 0.30 |
| Water | 20.75 |
| | 100.00 |

The alkali resin solids were 92% of the total nonvolatiles. The adhesion and tack of the sealer are satisfactory, when applied to a floor maintained with a buffable wax.

EXAMPLE V

In order to demonstrate the effectiveness of the various hydrocarbon solvents employed in the present invention, eight sealer compositions were prepared similar to that in Preparation Example I. The following solvents were substituted for xylene at a 10% level of addition: methyl isobutylketone, ethyl acetate, carbitol acetate, 2-ethylhexanol, toluene, naphtha, dipentene and trichloroethane. The adhesion and tack of such compositions, when applied to a floor, were almost as good as the xylenecontaining composition.

EXAMPLE VI

In order to illustrate the levels of addition of hydrocarbon solvents employed in the present invention, two sealing compositions similar to that illustrated in Preparation Example I were prepared, wherein 0.1% by weight of toluene and 20% by weight of xylene, respectively, were employed in place of xylene at the 3% level of addition. Similar results were obtained with regard to adhesion and tack.

In order to show the levels of addition of nonionic surfactants useful in the compositions of the invention, two floor sealing compositions similar to that illustrated in Preparation Example I were prepared employing 0.05% by weight of solids of nonionic surfactant and 8% by weight of solids of nonionic surfactant in place of 0.9% employed therein. Similar results were obtained regarding adhesion and tack.

COMPARATIVE EXAMPLE I

To demonstrate the results obtained when a sealing composition is prepared without emulsified xylene, two compositions were prepared, each containing:

| | % of Composition |
|---|---|
| Emulsion polymer*; | 62.5 |
| Alkali soluble resin**; | 8.0 |
| 28% ammonium hydroxide; | 0.5 |
| Wax emulsion***; | 2.0 |
| Tributoxyethyl phosphate; | 1.1 |
| Tall Oil fatty acids; | 0.8 |
| Fluorocarbon leveling agent; and | 1.0 |
| Water | 24.1 |
| | 100.0 |

*4.1 mixture of 43 MMA/52BA/5MA; 35% non-volatiles; Tg: 4° C. and 65S/20EA/15MAA; 35% non-volatiles; Tg: 80° C.
**67S/33AA; 20% non-volatiles.
***polyethylene wax emulsion; 40% non-volatiles.

The first composition did not contain an emulsified xylene, while the second composition contained 5% by weight of xylene, emulsified with 0.3% by weight of nonylphenol+12EO.

The second composition exhibited superior spread and better adhesion, when applied to heavily used vinyl floor tiles. A third composition was prepared employing xylene which was not emulsified with a surfactant. The results also showed that emulsified xylene sealer exhibits better spread than the nonemulsified xylene sealer.

The previous examples are illustrative only. Other variations and embodiments will be apparent to those with ordinary skill in this art. The invention is not to be limited except as set forth in the following claims.

What is claimed is:

1. A storage stable, self-polishing, sealing composition for a substrate, which is subject to accumulation of hydrophobic organic residues, which residues reduce the adhesion of said substrate to water-based finishing compositions, said composition comprising: an aqueous vehicle having therein (a) a self-polishing, film-forming polymeric coating agent selected from the group consisting of emulsion coatings, alkali-soluble coatings, solution coatings and mixtures thereof; and (b) an emulsified hydrocarbon solvent (i) having a solubility parameter of from about 7.8 to 9.8 and (ii) present in sufficient amounts to penetrate said accumulated hydrophobic organic residues and increase the adhesion of said substrate to water-based finishing compositions.

2. A storage stable, self-polishing, sealing composition for a substrate which is subject to accumulation of hydrophobic, oily or waxy organic residues, which reduce the adhesion of said substrate to finishing compositions, which comprises: an aqueous, emulsion-polymer floor coating composition including
(a) a hydrocarbon solvent (i) with a solubility parameter from about 7.8 to 9.8 and (ii) present in amounts from about 1 to 15% by weight of said composition, to penetrate said residue and;
(b) a nonionic surfactant to emulsify said solvent, said surfactant (i) having an HLB between about 12.5 and 15.5 and (ii) compatible with said hydrocarbon solvent.

3. A storage stable, self-polishing sealing composition for a substrate, which is subject to accumulation of hydrophobic, oily or waxy organic residues, which reduce the adhesion of said substrate to finishing compositions which comprises: an aqueous alkali-soluble polymer floor coating composition including:
(a) a hydrocarbon solvent (i) with a solubility parameter from about 7.8 to 9.8 and (ii) present in amounts from about 1 to 15% by weight of said composition to penetrate said residue and (b) a nonionic surfactant to emulsify said solvent, said surfactant (i) having an HLB between about 12.5 and 15.5 and (ii) compatible with said hydrocarbon solvent.

4. A storage stable, self-polishing sealing composition for a substrate, which is subject to accumulation of hydrophobic, oily or waxy organic residues, which reduce the adhesion of said substrate to finishing compositions which comprises: an aqueous solution polymer floor coating composition including (a) a hydrocarbon solvent (i) with a solubility parameter from about 7.8 to 9.8 and (ii) present in amounts from about 1 to 15% by weight of said composition, to penetrate said residue and (b) a nonionic surfactant to emulsify said solvent, said surfactant (i) having an HLB between about 12.5 and 15.5 and (ii) compatible with said hydrocarbon solvent.

5. The composition of claim 1 wherein the sealing composition comprises:

(I) from about 7 to 25% by weight of the composition of solids, said solids comprising from:

(a) 0 to 99% weight of an emulsion polymer having a glass transition temperature (Tg) from about $-15°$ C. to $+75°$ C.

(b) 0 to 92% by weight of an alkali-soluble resin, wherein the total weight of said emulsion polymer and said alkali soluble resin is at least about 20% by weight;

(c) 0 to 30% by weight of a wax;

(d) 0 to 10% by weight of a fatty acid;

(e) 0.05 to 8% by weight of a surfactant having an HLB from 12.5 to 15.5;

(f) 0 to 20% by weight of a plasticizer;

(g) 0 to 1% by weight of a leveling agent;

(II) from about 0.1 to 20% by weight of the composition of a hydrocarbon solvent having a solubility parameter from about 7.8 to 9.8 and an HLB from 12.5 to 15.5; and (III) the balance of the sealing composition comprising an aqueous vehicle, wherein sufficient ammonia is present to provide a pH for said sealing composition from 6 to 10.5.

6. The composition of claim 2 including from about 7 to 25% of the composition as solids, said solids comprising:

(a) from about 50 to 80% by weight of an emulsion polymer having a glass transition temperature between $-15°$ C. and 75° C.;

(b) from about 10 to 15 by weight of an alkali soluble resin;

(c) from about 3 to 5% by weight of a wax;

(d) from about 2 to 5% by weight of a fatty acid;

(e) from about 1 to 4% by weight of a non-ionic surfactant;

(f) from about 5 to 10% by weight of a plasticizer; and (g) from about 0 to 1% by weight of a leveling agent;

wherein said hydrocarbon solvent is present in amounts from about 3% to 5% by weight of said composition; and the balance of said composition being water, sufficient aqueous ammonia being added to provide the composition with a pH from about 6 to 10.5.

* * * * *